Patented Oct. 14, 1952

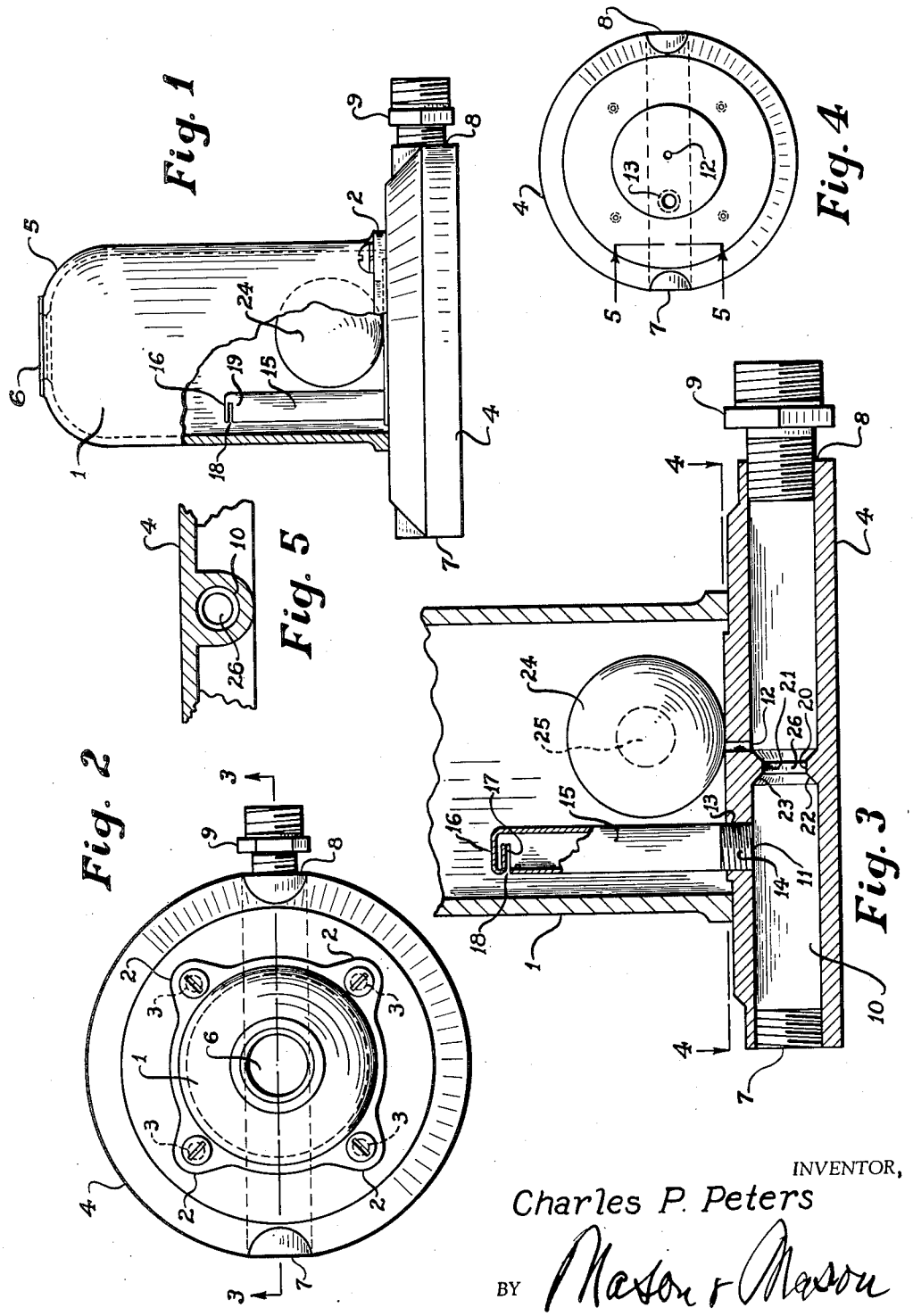

2,613,994

UNITED STATES PATENT OFFICE 2,613,994

COMBINED SPRINKLER AND DISPENSER

Charles Phil Peters, Arlington, Tex.

Application April 26, 1950, Serial No. 158,283

10 Claims. (Cl. 299—84)

1

This invention relates to a device which is attached in a hose-line and which may be used for a multiplicity of purposes, namely, as a dispenser for feeding and distributing fertilizer, seed, and other material on a lawn, as a cleanser for washing the outside of windows, Venetian blinds, and for automobiles, and as a dispenser which may be used for dispensing insecticides and disinfectants.

An object of the invention is to provide a receptacle for mixing various materials with water, whereby the materials mixed with water may flow out of the device for distribution over a surface such as a lawn, a floor, or a roof, et cetera.

A second object of the invention is to provide a mixing device which consists of a minimum number of parts and which provides an opening for the insertion of materials as long as there is no flow of water, but as soon as the flow of water starts the opening is automatically closed.

An additional object of the invention is to provide a mixing device which will feed into a moving stream of water various substances, such as plant food, fertilizer when used on lawns and gardens; which will feed soap or other detergents in the moving stream of water when used for cleaning surfaces, and which will feed an insecticide, fungicide, or disinfectants into a moving stream of water for disinfecting or other purposes.

Other objects will be disclosed throughout the specification.

In the drawings:

Fig. 1 is a side elevation of the device with a part of the receptacle broken out;

Figure 2 is a top plan view of the structure shown in Figure 1;

Figure 3 is a vertical sectional view partly broken away taken on the line 3—3 of Fig. 2;

Figure 4 is a horizontal sectional view taken on the line 4—4 of Fig. 3; and

Figure 5 is an enlarged detailed vertical sectional view taken on the line 5—5 of Fig. 4.

The invention may be described broadly as a mixing device which may be attached in a conduit system or in a hose-line. It may also be attached to any outlet for a flow of liquid, such as water.

Referring to the drawings, the numeral 1 indicates a bell-shaped receptacle in the general shape of an inverted cup. This receptacle is provided with a plurality of flanges 2. These flanges each have openings, indicated at 3, by which the open end of the cup or bell 1 may be attached to a circular base 4.

2

The interior of the cup or bell is provided with a semi-spherical surface as shown at 5, and the top of the bell has a circular opening 6. One side of the base is provided with a screw-threaded opening 7, and extending at an angle of 180° therefrom is a second screw-threaded opening 8. These openings form the inlets and outlets, respectively, for a hose or other conduit connector, none of which may be seen, at 9 in Fig. 1.

These openings are connected to each other by the conduit 10, and this conduit is provided with upwardly extending openings 11 and 12. The opening 11 is provided with suitable threads 13, so that it may be threadedly engaged by the threaded end 14 of the distributor pipe 15. The upper end of the distributor is provided with an end 16, which has a turned under portion. This construction, with the slot 18, provides a slotted opening which extends at least 180° above the circumference 19 of the upper end of the pipe.

The conduit 10, substantially midway of its length, is provided with restrictions 20 and 21 that have inclined shoulders 22 and 23. Immediately on the other side of the shoulders is located the opening 12.

Mounted within the receptacle is a ball 24 that is preferably composed of rubber or artificial rubber, except the core, indicated in dotted lines at 25. This core is preferably composed of cork. The shoulders 20 form a restricted opening 26 immediately in front of the opening 12 to produce a Venturi effect.

*Operation*

When it is desired to operate the device the receptacle may be filled with any one or a combination of substances to be dispensed, such as plant food and fertilizer. Or the receptacle may be filled or partially filled with either a washing or abrading compound, or an insecticide or disinfectant.

These substances may be inserted into the opening 6, in either liquid, solid, or semi-solid form, and it will be noted that the cover 16 prevents too much of the substances finding their way into the pipe 15, should a solid or semi-solid material be used.

Assuming that the suitable hose or other conduit connections have been made to the inlet and outlet openings 7 and 8, the water or other fluid is turned on; this has the effect of forcing water up the distributor tube 15, and as the receptacle fills with water the ball 24 rises on the surface of the fluid and acts as a valve closing the filler opening 6.

A portion of the water entering the pipe through opening 7 enters the restricted opening 26, which acts to produce a Venturi effect on the space on the other side of said opening, thus drawing the fluid through the opening 12 and forcing it toward the outlet 9.

It will be noted that the inside diameter of the distributor pipe 15 is considerably larger than the opening 12 so that the fluid passing through said opening 12 moves toward the exit end with considerable velocity, and this velocity is increased by the water flowing through the restricted opening 26.

The suction produced by the Venturi action of the fluid pressure plus the normal water pressure within the conduit 10 feeds the liquid laden with the plant food, fertilizer, or other matter, pulverized, solid, or semi-solid, through the opening 12 and out of the outlet 8.

The opening 6 is of such size that it is convenient for filling or charging the device with soap, fertilizer, disinfectant, insecticide, seeds or other material.

When the fluid is turned on there is an immense action of fluid within pipe 15 which thoroughly stirs and mixes the fluid and fertilizer, seeds, or other material due to the swirling action caused by the slotted opening 18.

This mixing action is assisted by the moving of the ball which is also caused to move around within the receptacle with considerable speed due to the lightness and the swirling action of the water issuing from the slot 18. The mixed fluid then flows out through opening 12 and the exit opening 8, into the exit section of hose. In this manner a vast improvement in the color growth and luxuriousness of all lawn grasses and plants is noticeable after the first few days of use. The proper use of the device thereafter will insure the user a superior lawn as well as flowers and vegetables. The device also may be used with any type of lawn sprinkler or with a hand nozzle, as well as with any irrigation system, as one or more of the devices may be connected to the several outlets of said irrigation system, provided, of course, the system includes conduits which may be connected to the opposite ends of the device.

The mixer may be used for a cleanser for washing windows, Venetian blinds, and automobiles. All that needs be done is to put in a proper amount of soap in opening 6, preferably liquid soap or soap flakes. By properly adjusting the nozzle on the hose that is connected to the conduit connector, both windows and Venetian blinds may be washed with a minimum of time and effort. Automobiles and floors, such as garage floors, may be easily, quickly and thoroughly washed in a fraction of the time ordinarily required. In order to do this it is only necessary to load the container 1 with a cleanser and spray the white foam from the hose nozzle that is connected to hose connector 9, on any object to be cleaned. Following this the object may be washed with fresh water.

The device may be used as a dispenser of insecticide or for spraying trees, walls, and floors, or porches. For instance, DDT may be used by depositing the liquid DDT in the opening 6 where it will be picked up as soon as the water is turned on and sprayed from the hose nozzle, not shown, onto the object to be sprayed. It will thus kill all ants, roaches, bugs and worms, and even cutworms. When sprayed over the outside of doors, porches and other places it will keep roaches and ants from getting into a house.

When used with one teaspoonful of this insecticide, or a similar insecticide, such amount will be sufficient to act as a cleanser around a kitchen sink and will get rid of all ants and roaches around the sink.

In order to clean the parts it is only necessary to unscrew the bolts (not shown) which engage in the openings 3, and which detachably clamp the bell-shaped receptacle to the base 4.

I desire to comprehend within my invention all embodiments within the scope of the appended claims.

I claim:

1. A dispenser for fertilizer, seeds, insecticides and other liquid and semi-liquid materials comprising a base, a passageway through said base, an inlet opening and outlet opening in said passageway, a distributor pipe attached to said base, a venturi in said pipe between said openings, a bell-shaped receptacle having a semi-spherical undersurface adjacent to the top thereof, an opening through said surface, and an opening forming an exit from the space within said receptacle to said conduit, and a floatable ball valve in said receptacle adapted to seat on said surface.

2. A dispenser for fertilizer, seeds, insecticides and other liquid and semi-liquid materials comprising a base, a passageway through said base, an inlet opening and outlet opening in said passageway, a distributor pipe attached to said base, a venturi in said pipe between said openings, a bell-shaped receptacle having a semi-spherical undersurface adjacent to the top thereof, an opening through said surface, and an opening forming an exit from the space within said receptacle to said conduit, said opening in said bell being circular, and being located at the apex of said bell, and a floatable ball valve in said receptacle adapted to seat on said surface.

3. A dispenser for fertilizer, seeds, insecticides and other liquid and semi-liquid materials comprising a base, a passageway through said base, an inlet opening and outlet opening in said passageway, a distributor pipe attached to said base, a venturi in said pipe between said openings, a bell-shaped receptacle having a semi-spherical undersurface adjacent to the top thereof, an opening through said surface and an opening forming an exit from the space within said receptacle to said conduit, said conduit in said base having a restricted passageway, and a floatable ball valve in said receptacle adapted to seat on said surface.

4. A dispenser for fertilizer, seeds, insecticides and other liquid and semi-liquid materials comprising a base, a passageway through said base, an inlet opening and outlet opening in said passageway, a distributor pipe attached to said base, a bell-shaped receptacle having a semi-spherical undersurface adjacent to the top thereof, an opening through said surface and an opening forming an exit from the space within said receptacle to said conduit, said conduit in said base having a restricted passageway, said restricted passageway being adjacent to the exit opening from said bell base, and a floatable ball valve in said receptacle adapted to seat on said surface.

5. A dispenser for fertilizer, seeds, insecticides and other liquid and semi-liquid materials comprising a base, a passageway through said base, an inlet opening and outlet opening in said passageway, a distributor pipe attached to said base, a venturi in said pipe between said openings, a bell-shaped receptacle having a semi-spherical undersurface adjacent to the top thereof, an opening through said surface, and an opening forming an exit from the space within said receptacle to said conduit, and means for detaching said bell from said base, and a floatable ball valve in said receptacle adapted to seat on said surface.

6. A dispenser for fertilizer, seeds, insecticides and other liquid and semi-liquid materials comprising a base, a passageway through said base, an inlet opening and outlet opening in said passageway, a distributor pipe attached to said base, a bell-shaped receptacle having a semi-spherical surface adjacent to the top thereof, an opening through said surface, and an opening forming an exit from the space within said receptacle to said conduit, said distributor pipe having a closed top and a slot in said top, and a floatable ball valve in said receptacle adapted to seat on said surface.

7. A dispenser for fertilizer, seeds, insecticides and other liquid and semi-liquid materials comprising a base, a passageway through said base, an inlet opening and outlet opening in said passageway, said passageway through said base having a restricted portion located between said inlet opening and said outlet opening, a distributor pipe attached to said base, a bell-shaped receptacle having a semi-spherical surface adjacent to the top thereof, an opening through said surface, and an opening forming an exit from the space within said receptacle to said conduit, and a ball in the space defined by said bell-shaped receptacle and that portion of the base which it covers.

8. A dispenser for fertilizer, seeds, insecticides and other liquid and semi-liquid materials comprising a base, a passageway through said base, an inlet opening and outlet opening in said passageway, said passageway through said base having a restricted portion located between said inlet opening and said outlet opening, a distributor pipe attached to said base, a bell-shaped receptacle having a semi-spherical surface adjacent to the top thereof, an opening through said surface, and an opening forming an exit from the space within said receptacle to said conduit, and a ball in the space defined by said bell-shaped receptacle and that portion of the base which it covers, said ball being floatable.

9. A dispenser for fertilizer, seeds, insecticides, and other liquid and semi-liquid materials comprising a base, a passageway through said base, an inlet opening and outlet opening in said passageway, said passageway through said base having a restricted portion located between said inlet opening and said outlet opening, a distributor pipe attached to said base, said distributor pipe being located between said inlet opening and said restricted portion of said passageway, a bell shaped receptacle having a semi-spherical surface adjacent to the top thereof, an opening through said surface, and an opening forming an exit from the space within the said receptacle to said passageway, and a ball in the space defined by said bell shaped receptacle and that portion of the base which it covers.

10. A dispenser for fertilizer, seeds, insecticides and other liquid and semi-liquid materials comprising a base, a passageway through said base, an inlet opening and outlet opening in said passageway, said passageway through said base having a restricted portion located between said inlet opening and said outlet opening, a distributor pipe attached to said base, said distributor pipe being located between said inlet opening and said restricted portion of said passageway, a bell shaped receptacle having a semi-spherical surface adjacent to the top thereof, said passageway having an additional opening connecting said bell shaped receptacle with said passageway, said additional opening being located between said restricted passageway and said outlet opening in said passageway, an opening through said semi-spherical surface, and a ball in the space defined by said bell shaped receptacle and that portion of the base which it covers.

CHARLES PHIL PETERS.

REFERENCES CITED

The following references are of record in the file of this patent:

UNITED STATES PATENTS

| Number | Name | Date |
| --- | --- | --- |
| 1,704,913 | Clauson | Mar. 12, 1929 |
| 1,786,561 | Collenburg | Dec. 30, 1930 |
| 2,299,473 | Eggleston | Oct. 20, 1942 |
| 2,513,566 | Kent | July 4, 1950 |